May 22, 1951 R. E. MACK 2,554,306
THEFT PREVENTION DEVICE FOR TRACTOR DRAWN TRAILERS
Filed Jan. 2, 1947 2 Sheets-Sheet 1
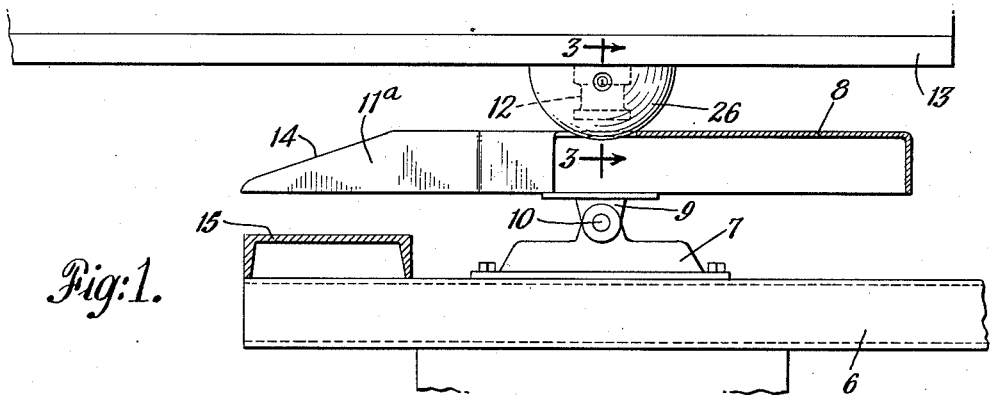
Fig:1.
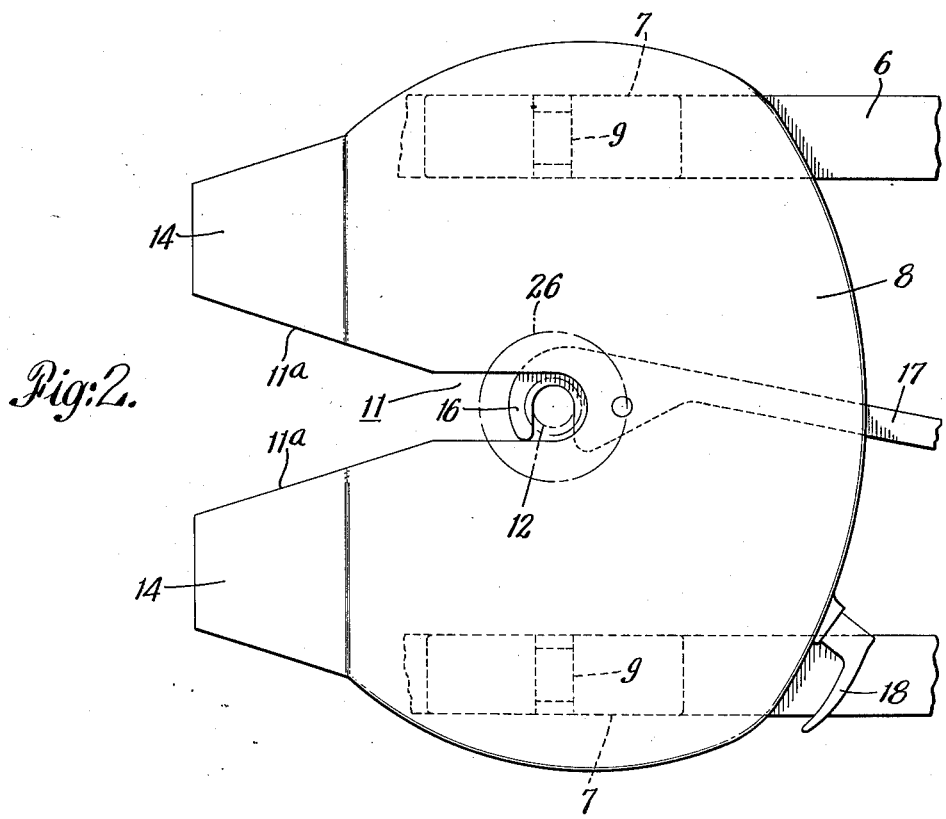
Fig:2.
INVENTOR
Robert E. Mack
BY
ATTORNEYS Patented May 22, 1951

2,554,306

UNITED STATES PATENT OFFICE 2,554,306

THEFT PREVENTION DEVICE FOR TRACTOR DRAWN TRAILERS

Robert E. Mack, Philadelphia, Pa.

Application January 2, 1947, Serial No. 719,738

6 Claims. (Cl. 280—33.05)

1

My invention relates to a theft-prevention device for use in connection with tractor-drawn trailers. Such trailers generally have a coupling pin (the "king" pin) on the under side near the front. The tractor has a coupling member in the form of a "fifth wheel" or circular plate which is adapted to slide under the trailer, lift the front end from the ground and engage the coupling pin. When the pin is locked into engagement with the plate, the trailer can then be hauled about by the tractor.

There have recently been many thefts of loaded trailers from loading and unloading platforms for it is not difficult for thieves to back up a tractor to a trailer and haul it away.

It is the primary object of my invention to provide an anti-theft device which will prevent unauthorized coupling of a tractor to a trailer.

A further object of my invention is to provide a lock-on cover for trailer coupling pins which will prevent engagement of the tractor with the trailer coupling pin when the cover is locked in place.

Another object of my invention is to provide a rugged lock-on cover for trailer coupling pins which is so constructed that it will not be easily broken, or pried or burnt off the pin.

A further object of my invention is to provide a lock-on cover for trailer coupling pins of such shape that it cannot be engaged by the tractor but will slide on the top of the trailer coupler plate if unauthorized coupling is attempted.

The foregoing objects and such others as may appear hereinafter are accomplished by means of the construction illustrated in the accompanying drawings wherein—

Figure 1 is an elevation showing the rear end of the tractor and the front end of the trailer with the locking cover in position on the coupler pin;

Figure 2 is a partial plan view of the rear end of the tractor showing the construction of the "fifth wheel" or tractor coupler member;

Figure 3:
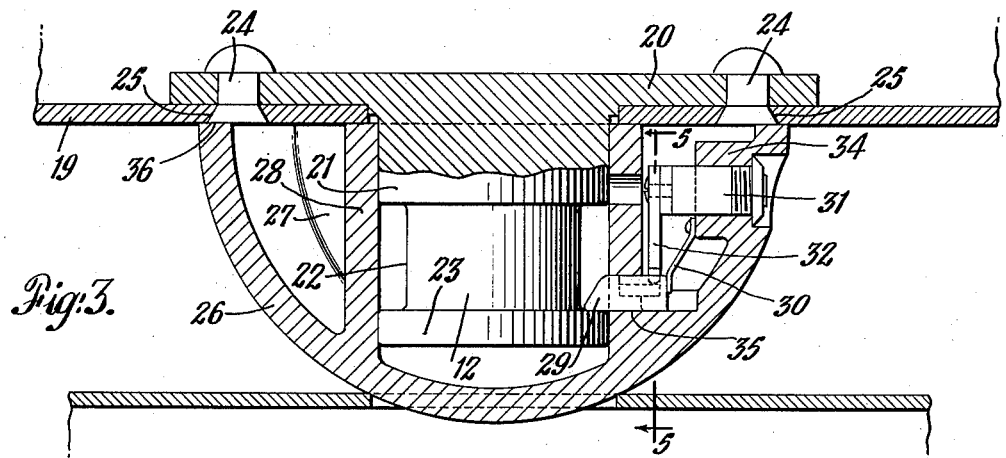
Figure 3 is an enlarged sectional view taken on the line 3—3 of Figure 1 showing the locking cover in position on the coupling pin of the trailer.

Referring now to Figures 1 and 2, reference numeral 6 indicates the tractor frame which supports a pair of trunnions 7 which are bolted to the frame. The "fifth wheel" or tractor coupler member 8 is mounted on the trunnion 7 by means of a pair of side arm shackles 9 and pins 10, and this mounting will permit the rear end of the coupler 8 to be tilted up or down for a purpose to be described hereinafter. The rear end of the coupler 8 has a cut away segment or slot 11 adapted to receive the "king pin" or trailer coupler pin 12 when the tractor is backed under the trailer 13. The walls 11a of the slot 11 engage the coupler pin 12 of the trailer when the tractor is backed under the trailer and guide the pin to the center of the tractor coupler member 8, as illustrated in Figure 2.

The rear end of the coupler 8 also has inclined portions or ramps 14 and when the tractor is to be coupled to the trailer the coupler 8 is tilted so that the ramps 14 will rest on the plate 15 carried at the rear of the tractor frame.

The coupling is effected as follows. With the ramps 14 resting on plate 15 the tractor is backed under the trailer with the slot 11 in such position that the trailer coupler pin will enter into the slot and be guided by the walls 11a to position centrally of the coupler 8. The ramps 14 will engage the under side of the trailer and lift the trailer and the front end trailer supports (not shown) from the ground. As the tractor moves back under the trailer the coupler 8 will be gradually tilted to horizontal position as shown in Figure 1.

In Figure 2 I have illustrated the parts in the position which they take when the tractor is ready to draw the trailer. The coupler pin 12 is locked to the coupler 8 by means of the hook 16 which is operated by the handle 17. The hook is held in position by a lock spring and is released by operation of handle 18 by means well known in the art.

What has been described above is a usual form of tractor-trailer coupler mechanism and is well known in the art. The dimensions of the coupler pin on the trailer have become more or less standardized in order to permit the trailer to be drawn by a variety of tractors and it will be readily understood that under such conditions an unguarded trailer could easily be coupled to a tractor and hauled away by thieves.

The apparatus which I am about to describe is designed to prevent coupling of the trailer and tractor by unauthorized persons and consists of the following parts. The trailer coupler pin 12 is secured to a plate 19 which is riveted or otherwise secured to the bottom of the trailer frame. The pin comprises a circular base 20 having a depending cylindrical portion 21 with an annular groove 22 into which the hook 16 of the tractor is adapted to fit. From the arrangement described it results that the lower end of the pin has a shoulder 23 which is adapted to prevent the hook from sliding off the pin and also serves another purpose which is to be later described. The cylindrical portion 21 of the pin fits into an opening in the plate 19 and is held in position by means of rivets 24 which are countersunk in appropriate openings 25 in the plate in order to provide a smooth undersurface.

Figure 4:
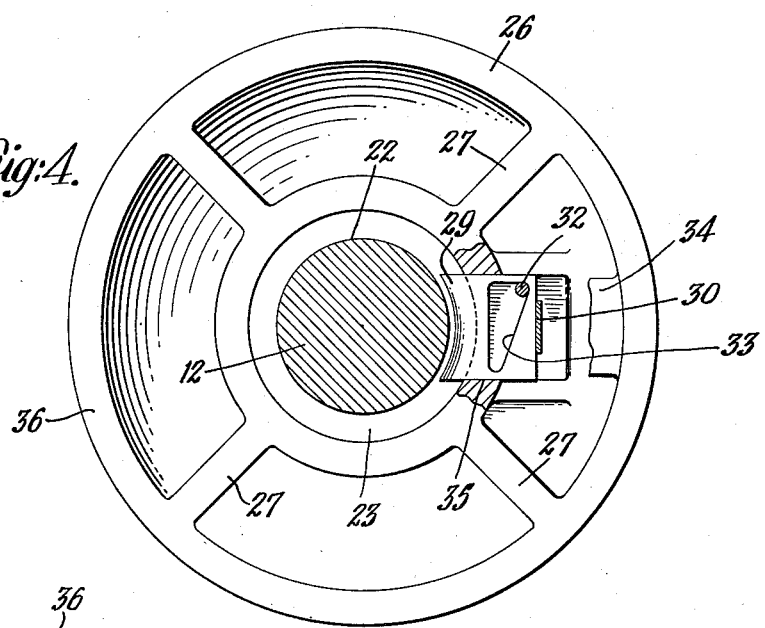
Figure 4 is a plan view of the lock-on cover with certain of the lock parts shown in section.
Figure 5:
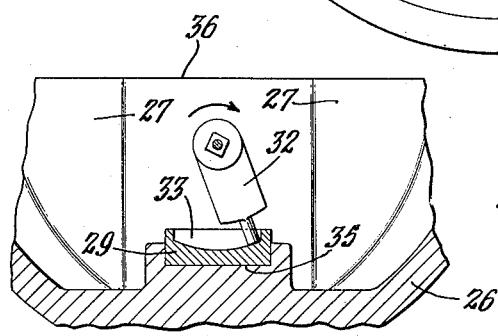
Figure 5 is a detail view on line 5—5 of Figure 3 showing certain parts of the lock.

My locking device comprises a substantially hemispherical cover for the pin 12 consisting of a bowl portion 26 connected by ribs 27 to sleeve 28 which is adapted to fit closely about cylindrical portion 21 of the pin. The cover is locked onto the pin by means of the latch 29 which extends through opening 35 in the sleeve 28. The latch 29 engages the shoulder 23 of the pin and is held in position by the spring 30. When it is desired to remove the cover from the pin, the key is inserted in the lock 31 and the lock is turned to move the lever 32 to the left. As illustrated in Figure 4, the lower end of this lever 32 engages the sloping wall of the slot 33 in the latch 29 and forces the latch backward against pressure of the spring 30 to permit the cover to be dropped off the pin. The lock is held in position in the sleeve 34 which is formed integrally with the wall 26 of the cover. It is to be observed that the upper edge of the cover 36 fits snugly against the bottom of the plate 19 in order to prevent the introduction of any tool between the plate and the cover which might be attempted in an effort to pry the cover from the pin. As was pointed out above, the dimensions of the king pin are to a large extent standardized and the cover would therefore be adapted for use on a large variety of trailers and will fit closely on all.

When the cover is locked in position on the pin, it will be impossible for the tractor coupler plate 8 to engage the pin as the dimensions of the cover are such that it will not fit between the wall of the slot 11. If unauthorized coupling is attempted, the hemispherical outer surface of the cover 26 will not enter the slot 11 but, on the contrary, as illustrated in Figures 1 and 3, will ride upon the edge walls 11a of the slot and unless backing of the trailer is stopped will permit the front edge of the trailer to ram into the back end of the tractor cab. Thus if unauthorized coupling of the tractor-trailer is attempted damage to the tractor cab could easily occur.

It will be understood that the cover 26 of the trailer does not have to be bowl-shaped or substantially hemispherical. It could be any shape so long as the size is great enough to prevent its entering notch 11 of the tractor coupler plate 8. However, I prefer the hemispherical shape for the cover as it makes it very difficult to attach the cover to the tractor. There is no projection or other surface configuration which would facilitate the connection of chains or rods if unauthorized removal of the trailer is attempted.

I claim:

1. For a tractor-trailer combination wherein the tractor has a slotted engaging plate with a coupling pin engaging member thereon and the trailer has a downwardly extending coupling pin on the bottom, said pin being adapted to fit within the narrow portion of the slot of the trailer engaging plate when the tractor is backed to couple with the trailer and to be engaged by said engaging member thereon, a theft-prevention device comprising a cover for said pin said cover having a tractor plate contact surface of greater horizontal dimension than the width of the narrow portion of the slot of the tractor plate, and lock means to lock said cover in position on the pin.

2. For a tractor-trailer combination wherein the tractor has a slotted engaging plate with a coupling pin engaging member thereon and the trailer has a downwardly extending coupling pin on the bottom, said pin being adapted to fit within the narrow portion of the slot of the trailer engaging plate when the tractor is backed to couple with the trailer and to be engaged by said engaging member thereon, a theft-prevention device comprising a cover for said pin, said cover having a generally bowl-shaped tractor plate contact surface of greater diameter than the width of the narrow portion of the slot of the tractor plate and having a sleeve adapted to fit closely about the pin, and lock means to lock said cover in position on the pin.

3. For a tractor-trailer combination wherein the tractor has a slotted engaging plate with a coupling pin engaging member thereon and the trailer has a downwardly extending coupling pin on the bottom, said pin being adapted to fit within the narrow portion of the slot of the trailer engaging plate when the tractor is backed to couple with the trailer and to be engaged by said engaging member thereon, a theft-prevention device comprising a cover for said pin, said cover having a generally bowl-shaped tractor plate contact surface of greater diameter than the width of the slot of the tractor plate and being of such depth that the upper edge thereof will engage the bottom of the trailer when the cover is locked into position, and lock means to lock said cover in position on the pin.

4. For a tractor-trailer combination wherein the tractor has a slotted engaging plate with a coupling pin engaging member thereon and the trailer has a downwardly extending coupling pin on the bottom, said pin being adapted to fit within the narrow portion of the slot of the trailer engaging plate when the tractor is backed to couple with the trailer and to be engaged by said engaging member thereon, a theft-prevention device comprising a cover for said pin, said cover having a generally bowl-shaped tractor plate contact surface of greater diameter than the width of the narrow portion of the slot of the tractor plate and having a sleeve adapted to fit closely about the pin, said sleeve being of greater length than the exposed portion of the pin, and lock means to lock said cover in position on the pin with the upper edge thereof in engagement with the bottom of the trailer.

5. For a tractor trailer combination wherein the tractor has a slotted engaging plate with a coupling pin engaging member thereon, a trailer having a coupling pin extending downwardly from the bottom thereof, said pin being adapted to fit within the narrow portion of the slot of the trailer engaging plate when the tractor is backed to couple with the trailer, a cover for said pin adapted to prevent the tractor plate from engaging the pin, said cover having a tractor plate contact surface of greater horizontal dimension than the width of the narrow portion of the slot of the tractor plate, a latch adapted to engage a trailer member to hold said cover in position about the pin with the upper edge thereof in contact with the bottom of the trailer, and lock means to operate said latch.

6. For use with a tractor having trailer-connection mechanism including a slotted plate, a trailer having a tractor-connection pin projecting downwardly therefrom in position to enter the slot of such a slotted connection plate of a tractor, the pin having a circumferential groove, a removable cover for the pin having an internal upwardly open socket shaped to receive the pin, and having a downwardly presented convexly curved external surface of greater horizontal diameter than the width of the slot in such a slotted connection plate and providing against entry of the pin into the slot of such a slotted plate when the cover is applied to the pin, a releasable latch carried by the cover in position to enter the circumferential groove of the pin to retain the cover thereon, and a lock for the releasable latch.

ROBERT E. MACK.

REFERENCES CITED

The following references are of record in the file of this patent:

UNITED STATES PATENTS

| Number | Name | Date |
|---|---|---|
| 1,176,828 | Haddow | Mar. 28, 1916 |
| 1,530,521 | Robinson | Mar. 24, 1925 |
| 1,751,629 | Harrington | Mar. 25, 1930 |
| 1,764,367 | Szymanski | June 17, 1930 |
| 2,350,633 | Obenauer | June 6, 1944 |
| 2,440,744 | Grinnell et al. | May 4, 1948 |